Figure 1:
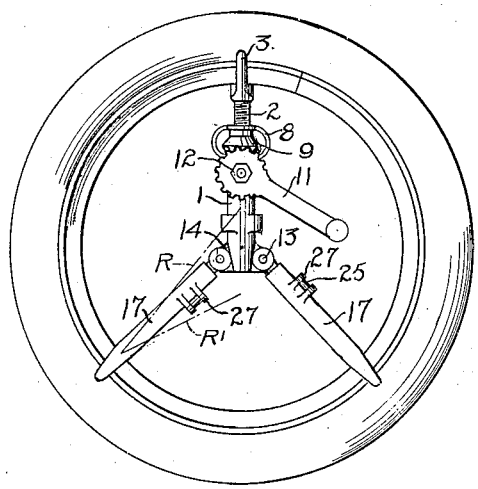

Sept. 20, 1927.
J. A. KENNEDY
1,643,122
RIM CONTRACTING AND EXPANDING TOOL
Filed Aug. 14, 1926
2 Sheets-Sheet 1

Inventor
John A. Kennedy

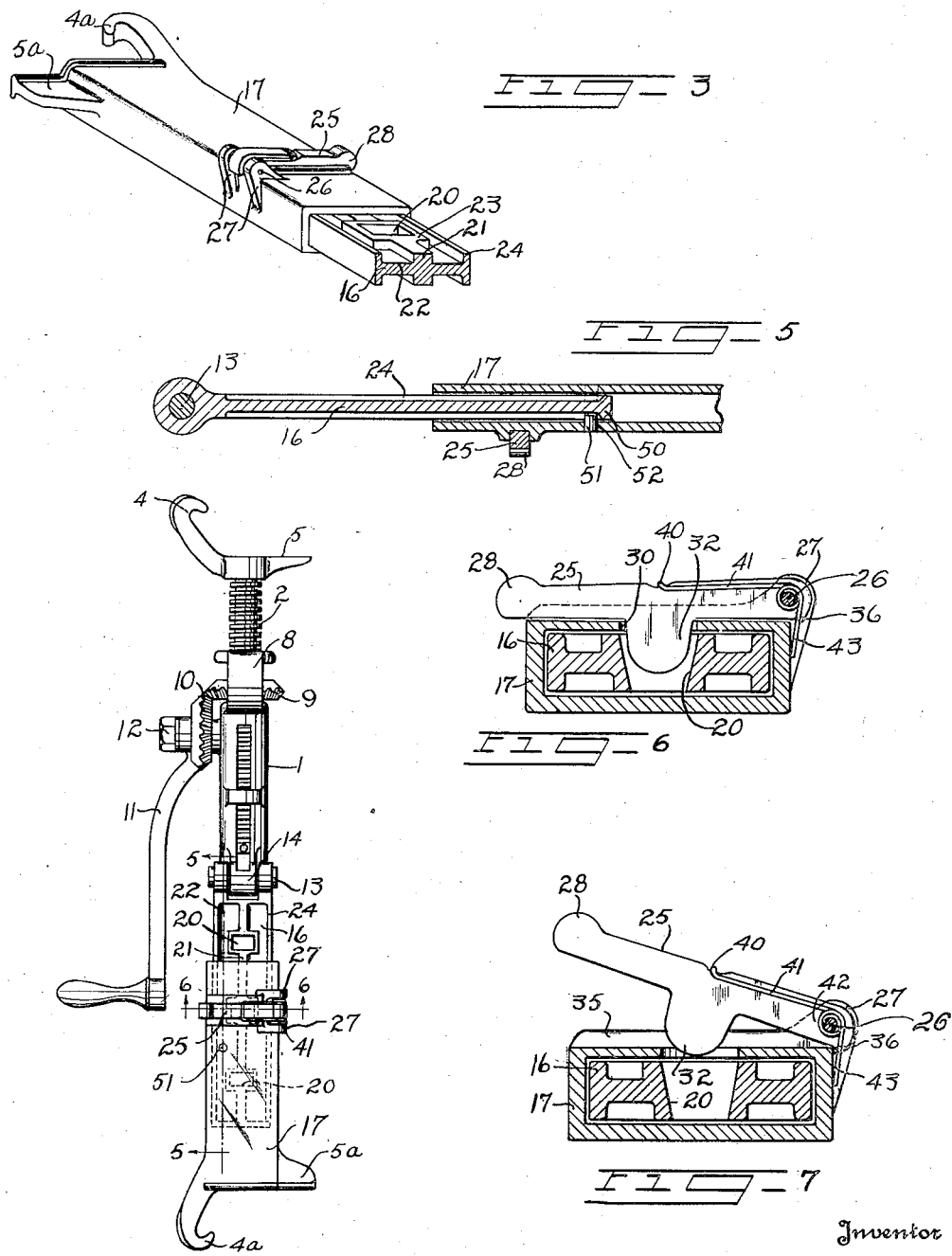

Patented Sept. 20, 1927.

1,643,122

UNITED STATES PATENT OFFICE.

JOHN A. KENNEDY, OF SEATTLE, WASHINGTON, ASSIGNOR TO PACIFIC RIM TOOL COMPANY, A PARTNERSHIP CONSISTING OF WILLIAM T. KENNEDY AND THOMAS L. KENNEDY, BOTH OF CLEVELAND, OHIO, AND JOHN A. KENNEDY, OF SEATTLE, WASHINGTON.

RIM CONTRACTING AND EXPANDING TOOL.

Application filed August 14, 1926. Serial No. 129,116.

This invention relates to tools for contracting and expanding rims for automobile wheels, and particularly to a tool which may be made up in a single size and may be effectively used interchangeably with the smallest balloon tire rims now made, the largest high pressure tire rims and with all the intermediate sizes without danger of the rim engaging members of the tool slipping out of place along the rim either in expanding or contracting.

The general object is to provide an efficient tool, which may be easily and quickly adjusted for use with a great number of sizes of rims. A more specific object is to provide a tool of the three-arm power-jack type which may be easily adjusted and applied to widely different sizes of rims in such a manner that irrespective of the size of the rim, the arms may be made to radiate at the most desirable angle to each other and substantially from the center of the rim. Further objects include the provision of a simple and easily operated adjusting device for an extensible arm of a rim contracting and expanding tool.

A number of rim tools, employing a pair of pivoted rim engaging arms and a hand power jack with a third rim engaging member to both pull and push on the rim, are so designed that by means of certain adjustments with respect to the pivoted arms, the tools may be used on widely different sized rims. However, it has been my experience that such adjustments as heretofore used, have not resulted in a satisfactory tool. In the first place, the adjusting means has been cumbersome and slow to operate. Second, the actual practice has been to change the pivotal center with reference to the body of the jack in order to shorten or lengthen the reach of the arms. This not only has the disadvantage of being slow and difficult but it makes it impossible to maintain the point from which the arms radiate even in close proximity to the center of the rim.

In this connection, it is to be observed that it is not sufficient to obtain coincidence of rim centers and intersection of the center lines of the arms by merely shifting the arms along the rim to position them closer together or farther apart. Experience has demonstrated that, in order to prevent distortion of the rim certain relations between the arms must be maintained. For example when expanding the rim into its original shape considerable power is required particularly if the rim is heavy or the tire stiff. In such case the arms must be spread out substantially as shown in full lines in the drawings to prevent distorting the rim and making it oval shaped. If, instead of being so positioned, the pivoted arms have to be brought close together in order to prevent them from sliding out of place, the tool is a little better than a simple jack and block or a tool which extends diametrically across the rim, the main disadvantage of which is that rims are often distorted by their use, particularly when expanding the rim to lock it.

The manner in which my tool overcomes the above objections will be made clear in the detailed description to follow which relates to the accompanying drawings showing my preferred form. The essential characteristics are summarized in the claims.

Figure 2:
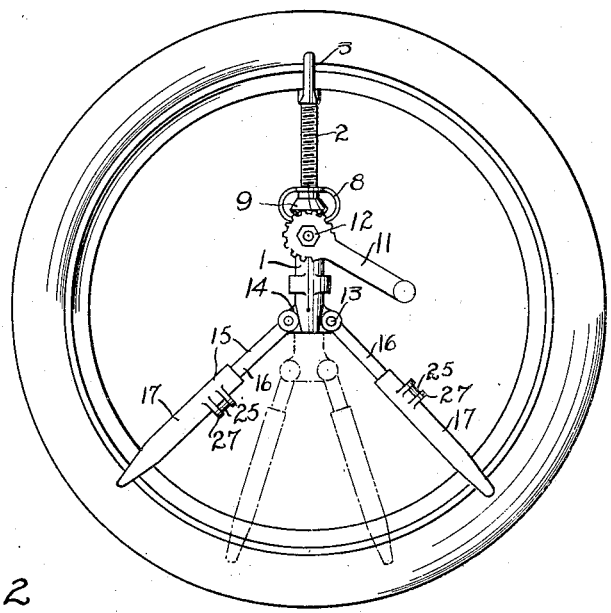

In the drawings, Fig. 1 is a plan view showing my tire tool applied to a small rim; Fig. 2 shows the tool adjusted and applied to a much larger rim; Fig. 3 is a perspective view showing the preferred construction of the pivoted arms; Fig. 4 is a side elevation of the tool; Fig. 5 is a longitudinal cross sectional view as indicated by the line 5—5 on Fig. 4; Figs. 6 and 7 are cross sectional views indicated on the lines 6—6 on Fig. 4 each showing the adjusting and locking means in a different position.

Referring in detail to the drawings and indicating the various parts by suitable characters, 1 designates the body or shank of the tool, shown as comprising a hollow casting adapted for supporting a screw 2 to which is secured a rim engaging hook and pusher member 3 having a claw portion 4 and pusher portion 5 extending outwardly beyond the screw opposite the hook. To operate the screw I preferably employ a nut 7 threaded on the screw and shown as confined against axial movement in either direction relative to the body by an open looped portion 8 of the body casting in which the nut may turn freely on the screw to advance or retract it. The nut carries beveled gear teeth 9 meshing with complementary gear teeth 10 on a hand crank 11, secured as by means of a stud 12 to the body casting.

Secured to the end of the body member, opposite the nut, is a pair of arms 15, each being shown as comprising a central member 16, pivoted at 13 to ears 14 on the body 1 and slidable within a hollow member 17 provided with a hook 4ª and pusher 5ª similar to the hook and pusher on the end of the screw.

I have shown the pivoted arms capable of being adjusted to three positions, namely the shortened position as shown in Fig. 1; intermediate as shown in Fig. 4; and fully extended as shown in Fig. 2. Examples of the application of the tool to various sized rims are illustrated in Figs. 1 and 2, the former figure showing the tool applied to a small rim. It will be noted that when so applied and with the screw extended only partially, the arms may be widely disposed in order to prevent distorting the rim and may radiate substantially from the center of the rim, wherefore there is no tendency for these arms to slip in either direction. If the arms radiated from a point above this center, for example along the dotted line R, and power applied to expand the rim, the arms would have a tendency to creep along the rim toward each other. Obviously if the point of radiation were on the other side of the rim center, as along the line R¹, the slippage would be in the opposite direction, namely tending to spread the arms when either expanding or contracting the rim.

When applied to medium sized rims the arms are adjusted to the intermediate position as in Fig. 4, and when applied to a large sized rim the arms are extended as shown in Fig. 2 to the outermost position, wherein it will be seen that the relation of all the parts is substantially the same as in Fig. 1, namely with the arms radiating from the true center of the rim.

I have illustrated in broken lines in Fig. 2 a condition that would arise in case the length of each arm is fixed. For example, suppose this corresponds to the medium length obtainable by the present adjustable arms. Then suppose further that, in order to be able to use the tool at all with a very small size rim such as a small balloon tire rim, the pivot for the arms may be moved upwardly along the shank of the jack, thus shortening the effective length of the arms. It will be seen first that, when using such a tool on a rim having the proportions shown in Fig. 2, the arms would have to be positioned near the end of the shank about as shown, in order to reach the rim even though the screw has been considerably extended, and further that the arms would have to be positioned closely together to prevent slipping by reason of the condition referred to in connection with line R¹ Fig. 1. The result would be, first, that the screw would be in danger of becoming bent when the tool is forced down onto the rim because the screw is extended so far from its bearings, and second, that the tool would be very likely to distort the rim, in expanding to lock it, because of in effect engaging the rim at only two points instead of three.

The means whereby I am able to quickly adjust the tool for any sized rim consists as shown particularly in Figs. 3 to 7 in providing a plurality of apertures such as 20 in each member 16 three of such apertures being shown. Obviously this number may be increased or diminished should there be a greater or less variation in rim sizes in the future. To secure lightness of construction as well as a saving of the material composing the member 16, I have shown this member as substantially I shaped in cross section with a central raised rib 21 rising from the web 22 of the I section, this rib 21 being flush with the tops of hollow boss portions 23 through which the apertures 20 extend. The locking means comprises a pivoted bar 25 extending transversely across each member 17, the bar being hinged as by a pin 26 to ears 27 rising from the member 17 and extending along adjacent intersecting side surfaces of this member. This bar as shown in Fig. 6 may have an enlarged portion 28 at its free end extending over the edge of the member 17 by which it may be easily manipulated to unlock the arm members as shown in Fig. 7. The bar carries a lug 32 which extends through an opening 30 into the selected aperture 20 when the bar is in normal position. The function of the ribs 21 is primarily to hold the lug 32 in upraised position when the arm is being extended or retracted from one position to another. The lug of each bar merely rides along the rib and is forced into the next encountered aperture by a spring, which will be later described, wherefore the operator has only to release the bar but does not have to hold it in released position.

In order that the strain on the bar may not be transmitted to the pivot pin directly and thus cause the pin to become bent, I preferably provide a groove such as 35 formed by ribs 35ª extending substantially the entire length of the bar and on either side thereof and preferably closely embracing it with only enough side clearance to admit easily raising and lowering the bar.

To prevent the bar from being swung too far outwardly into such a position as it would be likely to be broken off I may provide an abutment 36 which as shown in Fig. 7 engages the side surfaces of the member 17 substantially when the lug 32 is disengaged from the member 16. The position of such an abutment may be varied as it could be arranged in different ways to limit the movement of the bar, although as shown it is very convenient since it does not require any special cooperating lug or boss on the member 17.

For normally maintaining the bar in position, with the lug 32 extending into the slotted aperture, I provide a very simple coil spring preferably formed of one piece. This spring overlies the bar as at 40 and extends alongside thereof as at 41 to the coils 42 which embrace the pin. The free ends extend downwardly from the coils into engagement with the edge surface of the member 17 as at 43. By this construction no special provision has to be made for retaining the spring other than to provide room enough for the coils between the pivoted end of the bar and the ears. Since tire tools necessarily receive hard usage and are not given very great care, it is highly desirable that the spring be fairly well protected. It will be noted that the overlying portion 40 of the spring is protected by a slight groove in the bar, the portions 41 by the bar itself and the coils and portions 43 by the ears.

In order to prevent the entire removal of the outer members of the telescoping arms, I utilize one of the grooves extending between the flanges 24 of the I section and the bosses 23, the end of this particular groove terminating in an abutment 50. Slightly forwardly of the locking bar as shown in Fig. 5 is a pin 51 which may have a drive fit in an opening 52 in the member 17, the inner end of the pin serving to engage the abutment as a stop to limit the outward movement of the member 17 past its last adjustment.

I believe that there has never been available a tool of the three-arm power-jack type which may be easily enough adjusted to be satisfactory for garage use. Such use requires not only quick and easy adjustment but sturdiness of construction and capability of use just as effectively with one size of rim as with another. From the above description it will be seen that by reason of its simplicity and lightness of construction my rim tool meets these requirements and is highly suitable for general use by individual car users as well.

I claim:

1. A rim expanding and contracting tool, comprising a main frame, a rim engaging member supported thereby and movable relative thereto, power increasing means to advance and retract said member, two arms pivoted to the main frame at the end opposite said member, each of said arms comprising sections relatively and longitudinally slidable, and means including a locking member movably carried by one of said sections and forming a permanent part thereof and arranged to engage the other section at definite separated points for locking the sections in various positions, whereby the tool may be quickly adjusted for effective use on widely different sized rims.

2. In a rim expanding and contracting tool, a frame member, a rim engaging member carried thereby and movable relative thereto, power increasing means carried by the frame member to advance and retract said rim engaging member, a pair of arms pivoted to the frame at the end opposite said rim engaging member, each of said arms comprising relatively and longitudinally slidable sections one fitting over the other, a transversely extending locking bar carried by the outer of said sections, means extending from the bar through the wall of the latter section and arranged to engage the other section at a plurality of separated points, a pivot pin for the bar and a spring coiled about the pin and having one of its ends overlying the bar and the other extending downwardly alongside the outer section to hold the bar in locking position.

3. In a rim tool, a main frame member, a movable rim engaging member carried thereby, power increasing means carried by the frame for advancing and retracting said rim engaging member, a pair of arms pivoted to said frame member, each of said arms comprising relatively slidable sections, one within the other, the inner sections being substantially I shaped in cross section and provided with raised hollow bosses on the web portions thereof, a transversely extending locking bar carried by each outer section and having a portion thereof extending into engagement with the bosses, and means including a pin extending within each outer section and projecting between one side of the bosses and one of the flanges of the I section, and an abutment near the end of the I section, said abutment being arranged to engage the pin for preventing the entire removal of the outer section from the inner section.

4. A rim expanding and contracting tool, comprising a main frame, a rim engaging member carried thereby and movable relative thereto, power increasing means carried by the frame for moving the member, two arms pivoted to said frame member, each of said arms consisting of relatively and longitudinally slidable sections, one surrounding the other, one section being adapted to engage the rim, transversely extending hinged locking members secured to each outer section, each having a lug extending through the wall thereof and arranged to selectively engage spaced openings in the respective inner sections, and means for holding the locking members in locking position.

5. In a rim expanding and contracting tool, a hand power jack, the driven member of which is adapted to engage a rim to push and pull it, two members each adapted to engage the rim to push and pull it, said latter members being pivoted to the jack frame, and comprising telescoping sections, a locking bar carried by each outer section, means for maintaining the respective locking bars in locking position, there being means on each locking bar for engaging an inner section through the wall of the outer section, each of said outer sections having a groove extending along the bar, the side surfaces of the groove engaging the bar for laterally supporting it, said bars having their free ends extending past the edges of the respective outer sections to facilitate manual release.

In testimony whereof, I hereunto affix my signature.

JOHN A. KENNEDY.